Jan. 28, 1930.　　　　G. KEITH　　　　1,745,261
STEERING WHEEL LOCK
Filed Dec. 29, 1928

INVENTOR.
Grady Keith,
BY Irving L. McBathan
ATTORNEY

Patented Jan. 28, 1930

1,745,261

UNITED STATES PATENT OFFICE

GRADY KEITH, OF OKLAHOMA CITY, OKLAHOMA

STEERING-WHEEL LOCK

Application filed December 29, 1928. Serial No. 329,202.

This invention relates to vehicle steering wheels and more particularly to an attachment therefor for preventing the steering of an automobile by unauthorized persons and thereby lessening the likelihood of the automobile being stolen.

One of the primary objects of the invention is to provide novel means for associating a combination lock with an automobile steering wheel whereby the wheel can be either locked with or unlocked from the steering wheel shaft, the wheel when being unlocked from the shaft preventing use of the vehicle by unauthorized persons.

Another salient object of my invention is to provide a novel steering wheel lock in which the hub of the steering wheel and the upper end of the steering wheel shaft are provided with interfitting cups for forming a closed housing, the cups being normally freely rotatable one relative to the other, the housing having associated therewith a combination lock for controlling the movement of a locking bolt, the bolt when being locked in its extended position holding the cups against relative movement whereby the vehicle can be steered, and when the bolt is in its retracted position allowing the free rotation of said cups.

A further object of the invention is the provision of novel means for mounting the operative parts of the lock within the housing formed by the cups.

A still further object of the invention is to provide an improved steering wheel lock of the above character which will be durable and efficient in use, one that will be simple and easy to manufacture, and one which can be placed upon the market at a reasonable cost.

With these and other objects in view, the invention consists in the novel construction arrangement and formation of parts, as will be hereinafter more specifically described, claimed, and illustrated in the accompanying drawings, in which drawings:—

Figure 1:
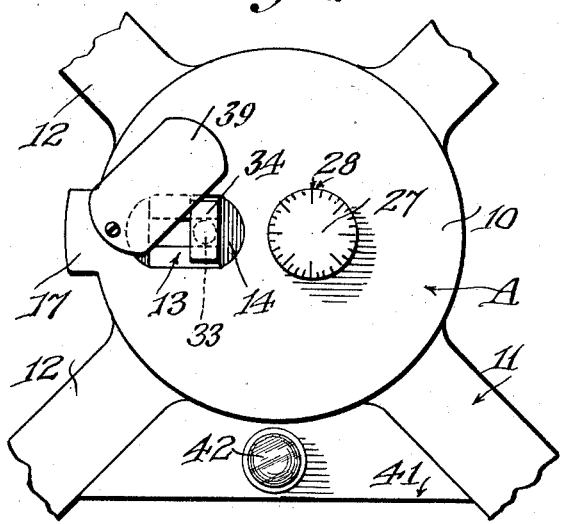
Figure 1 is a fragmentary top plan view of my improved steering wheel lock.
Figure 2:
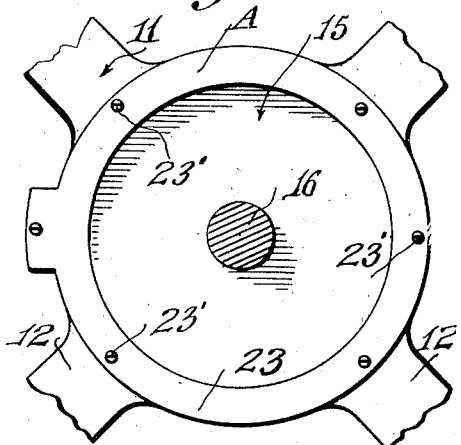
Figure 2 is a bottom plan view of the same, showing the steering wheel shaft in section.
Figure 4:
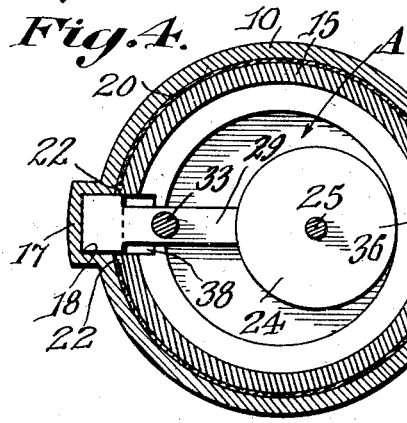
Figure 4 is a section through the same taken on the line 4—4 of Figure 3, looking in the direction of the arrows.
Figures 5, 6:
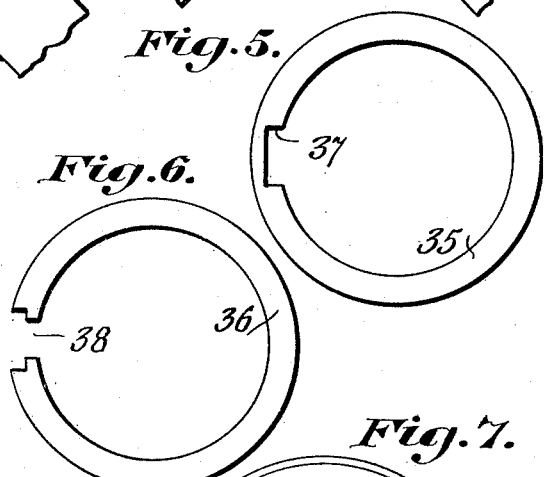
Figure 5 is a detail plan view of the top guide ring or flange.
Figure 6 is a detail plan view of the lowermost guide ring or flange.
Figure 7:
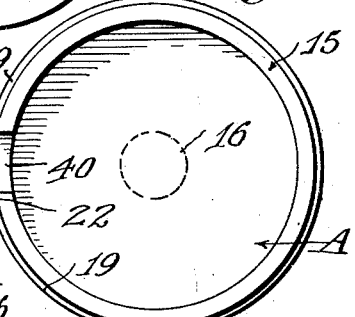
Figure 7 is a detail top plan view of the cup carried by the steering wheel shaft.

Referring to the drawings in detail, wherein similar reference characters designate corresponding parts throughout the several views, the letter A generally indicates my improved steering wheel lock which comprises an inverted cup shaped housing 10 which forms the hub for the steering wheel 11. As clearly shown in Figures 1, 2, and 3 the steering wheel includes a plurality of spokes 12 which can be integrally connected with the cup-shaped housing 10. The upper wall of the housing 10 is provided with a slot 13 terminating short of the axial center of the cup and the opposite end walls of the slot 13 are beveled as at 14 for a purpose which will also be hereinafter more fully set forth.

In connection with the inverted cup-shaped housing 10, I provide a second cup-shaped housing 15 which is formed on or secured to the steering wheel shaft 16 in any desired way. In assembling the device, the cup 15 is received within the cup 10 and the cups normally rotate one relative to the other. It is to be noted that the side wall of the cup 10 in alignment with the slot 13 is provided with a lateral struck-out socket 17 which forms an interior vertically extended way 18. This way 18 forms a keeper as will be later brought out. The outer wall of the inner cup 15 is preferably reduced in diameter as at 19 and this reduced portion receives a felt lining 20. This wall is also provided with a vertical slot or groove 21 which can be moved into registration with the way 18 and the wall on each side of the slot or way 21 is provided with shoulders 22 for engaging the ends of the felt lining so as to retain the same in place during rotation of one cup relative to the other.

It is obvious that when the inner cup 15 is placed within the outer cup 10 that a complete closed housing will be formed and in order to prevent the separation of these cups I provide a retaining ring 23 which can be secured to the cup 10 in any desired way such as by the use of screws 23'.

I mount within the cup 10, a combination lock 24 which is of conventional construction and which will not be shown in detail, it being understood that the lock is of the type used on safes or the like and includes a rotatable shaft 25 which is extended through a bearing opening 26 formed in the top wall of the cup 10. This shaft receives a dial knob 27 and the cover can be marked with an indicating arrow 28 and by turning the dial knob the combination can be worked in the usual way. The combination lock 24 includes a lock bolt 29 and the combination lock is of the type which locks the bolt either in a retracted or in an extended position.

Figure 3:
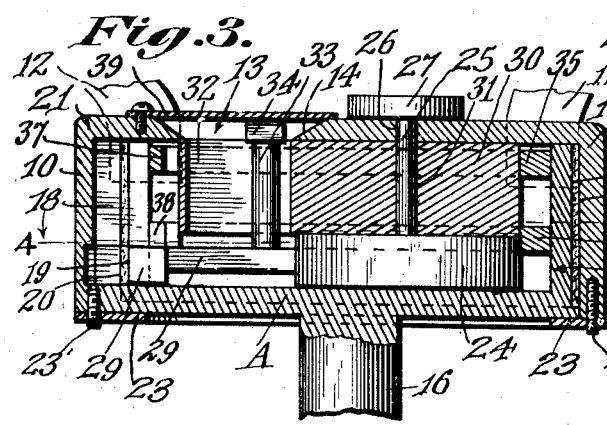
Figure 3 is an enlarged diametrical section through the improved steering wheel lock.

A spacing block 30 is interposed between the combination lock proper 24 and the outer wall of the inverted cup 10 and the spacing block, the combination lock and the cup can be secured together as a single unit in any desired way, and as clearly shown in Figure 3 of the drawing the spacer block 30 is provided with a bearing opening 31 for the reception of the dial shaft or stem 25. Further the block is provided with a longitudinally extending guide slot 32 for the reception of the manipulating rod 33 of the plunger 29. The upper end of this rod extends through the slot and is provided with a manipulating head 34 which is received in the slot 13 formed in the top plate of the cup 10.

By having the opposite ends of the slots beveled as at 14, the manipulating knob 34 can be readily grasped.

In order to provide a further support for the spacer block 30 and to add rigidity to the entire structure, I provide upper and lower spacer rings or flanges 35 and 36 which may be made integral with the side wall of the inner cup 15, or as shown, separate therefrom. When the rings 35 and 36 are made separate from the inner cup 15, the same can be welded or otherwise secured to the side wall thereof.

In order to facilitate the assembling of the device the uppermost ring 35 is provided with a notch 37 in its inner face for the passage of the lock bolt 29 while the lower ring 36 is provided with a slot 38 which can be shaped to conform to the configuration of the bolt.

A swinging cover plate 39 can be carried by the top wall of the cup 10 for normally covering the slot 13 and the manipulating knob 34 and rod 33.

In assembling the device the various parts are connected to the outer cup 10, namely the spacer block 30, the combination lock proper 24 with its bolt 29 after which the outer cup is slipped over the inner cup, as shown in the drawings. The retaining ring 23 is now secured to the outer cup by means of the screws 23' and this ring will prevent the separation of the parts.

In operation of the improved lock for the steering wheel, when it is desired to steer the vehicle, the combination is worked so as to permit the releasing of the bolt 29 and the socket or keeper recess 18 is brought into registration with the slot 40 in the inner cup 15 after which the manipulating knob 34 is grasped and the bolt is moved through the slot 40 into engagement with the walls of the keeper recess.

The dial knob 27 is then turned so as to prevent the accidental retracting of the bolt 29 and the cups 10 and 15 are then locked together so as to permit the steering of the vehicle in the usual way.

When the driver of the vehicle leaves his car he can turn the dial knob 27 and work the combination of the lock 24 after which the manipulating knob 34 can be grasped so as to throw the bolt 29 into its retracted position and the dial is then rotated so as to lock the bolt in its retracted position. The cups 10 and 15 are then unlocked and the cup 10 is permitted free rotation on the cup 15. Thus the steering of the vehicle will be prevented and the consequent stealing thereof lessened.

In order to facilitate the working of the combination at night time, the steering wheel can be provided with a plate 41, which can support a small incandescent lamp 42 the current for which can be supplied from any suitable source of energy. A switch for the lamp can be placed at any convenient point.

From the foregoing description, it can be seen that I have provided a novel lock for steering wheels which can not be picked or operated by a duplicate or skeleton key and which can only be operated by persons knowing the combination of the lock.

Changes in details may be made without departing from the spirit or the scope of this invention, but what I claim as new is:

The combination with a steering wheel including a hollow hub having a keeper recess in the side wall thereof, of a steering shaft, a cup shaped housing carried by the upper end of the steering shaft arranged within the hollow hub having a slot in the side wall thereof adapted to register with the keeper recess, a combination lock arranged within the hollow hub and the cup including a dial spindle and a dial knob on said spindle arranged exteriorly of the hub, a spacer block connected to the hollow hub and to said combination lock having a longitudinally extending slot therethrough, a lock bolt adapted to engage the walls of the slot and the keeper recess when in its extended position and adapted to be out of engagement with the walls of the slot and the keeper recess when in its retracted position, the combination lock having means for locking the bolt in its extended position against movement, a manipulating rod for the bolt extended through the slot and spacer block and a manipulating knob for said rod, the hub having the slot in the top wall thereof for the reception of said manipulating knob.

In testimony whereof I affix my signature.

GRADY KEITH.